United States Patent
Uehling et al.

(10) Patent No.: US 11,146,948 B1
(45) Date of Patent: Oct. 12, 2021

(54) ELECTRONIC SUBSCRIBER IDENTITY MODULE (ESIM) TRANSFER VIA ACTIVATION CODE

(71) Applicant: T-MOBILE INNOVATIONS LLC, Overland Park, KS (US)

(72) Inventors: Philip W. Uehling, Olathe, KS (US); Ryan P. Dreiling, Shawnee, KS (US); Balasubramaniam Guru, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 55 days.

(21) Appl. No.: 16/675,188

(22) Filed: Nov. 5, 2019

(51) Int. Cl.
| | |
|---|---|
| *H04W 8/26* | (2009.01) |
| *H04W 12/06* | (2021.01) |
| *G06K 19/06* | (2006.01) |
| *H04L 29/12* | (2006.01) |
| *H04L 29/06* | (2006.01) |
| *H04W 12/30* | (2021.01) |

(52) U.S. Cl.
CPC ...... *H04W 8/265* (2013.01); *G06K 19/06037* (2013.01); *H04L 61/1511* (2013.01); *H04L 63/0853* (2013.01); *H04W 12/06* (2013.01); *H04W 12/35* (2021.01)

(58) Field of Classification Search
CPC ..... H04W 8/265; H04W 12/35; H04W 12/06; G06K 19/06037; H04L 61/1511; H04L 63/0853
See application file for complete search history.

(56) References Cited

U.S. PATENT DOCUMENTS

| | | |
|---|---|---|
| 9,184,801 B2 | 11/2015 | Li et al. |
| 9,198,024 B1 | 11/2015 | Khalid et al. |
| 9,560,693 B2 | 1/2017 | Schell |
| 9,831,903 B1 | 11/2017 | Narasimhan et al. |
| 9,949,113 B1 | 4/2018 | Vasudevan et al. |
| 10,057,760 B2 | 8/2018 | Yang et al. |
| 10,061,942 B2 | 8/2018 | Yang et al. |
| 10,141,966 B2 | 11/2018 | Narasimhan et al. |

(Continued)

OTHER PUBLICATIONS

Guru, Balasubramaniam, et al., "Mobile Phone Peer-To-Peer Electronic Subscriber Identity Module (eSIM) Transfer," filed Feb. 20, 2020, U.S. Appl. No. 16/796,373.

(Continued)

*Primary Examiner* — Diane D Mizrahi

(57) ABSTRACT

A mechanism for sharing electronic subscriber identity module (eSIM) credentials between two mobile communication devices is described. This includes establishing, by a source user equipment (UE) comprising a first of the mobile communication devices, a data connection with a subscription manager data preparation (SMDP+) server associated with eSIM credentials stored at the source UE. The source UE notifies the SMDP+ server of an intent to transfer the eSIM credentials. The source UE receives metadata describing an activation code containing identification data for the eSIM credentials. The source UE forwards the activation code to a destination UE comprising a second of the mobile communication devices. The activation code is forwarded to support a download of the eSIM credentials to the destination UE from the SMDP+ server.

20 Claims, 9 Drawing Sheets

(56) References Cited

U.S. PATENT DOCUMENTS

| | | |
|---|---|---|
| 10,142,917 B2 | 11/2018 | Narasimhan et al. |
| 10,149,145 B2 | 12/2018 | Li et al. |
| 10,149,150 B1 | 12/2018 | Vasudevan et al. |
| 10,244,501 B2 | 3/2019 | Miao et al. |
| 10,277,587 B2 | 4/2019 | Li et al. |
| 10,277,734 B2 | 4/2019 | Hentschel |
| 10,334,427 B2 | 6/2019 | Yang |
| 10,356,614 B2 | 7/2019 | Li et al. |
| 10,368,235 B1 | 7/2019 | Balasubramanian et al. |
| 10,382,919 B2 | 8/2019 | Karimli et al. |
| 10,405,181 B2 | 9/2019 | Li et al. |
| 10,425,118 B2 | 9/2019 | Yang |
| 10,652,728 B1 | 5/2020 | Guday et al. |
| 10,681,665 B2 | 6/2020 | Singh et al. |
| 10,687,298 B2 | 6/2020 | Miao et al. |
| 10,708,766 B1 | 7/2020 | Umamaheswaran et al. |
| 10,764,746 B1 * | 9/2020 | Dreiling ................ H04W 8/205 |
| 10,820,189 B2 | 10/2020 | Dumoulin et al. |
| 11,064,347 B1 | 7/2021 | Dreiling et al. |
| 2015/0350876 A1 | 12/2015 | Khalid et al. |
| 2018/0352425 A1 | 12/2018 | Vasudevan et al. |
| 2018/0352530 A1 | 12/2018 | Singh et al. |
| 2019/0037401 A1 | 1/2019 | Egner et al. |
| 2019/0174299 A1 | 6/2019 | Ullah et al. |
| 2019/0208417 A1 | 7/2019 | Kang et al. |
| 2019/0289455 A1 | 9/2019 | Namiranian |
| 2019/0327591 A1 | 10/2019 | Karimli et al. |
| 2019/0349743 A1 | 11/2019 | Hamblet |
| 2019/0387396 A1 | 12/2019 | Gui |
| 2020/0059778 A1 | 2/2020 | Li et al. |
| 2020/0137557 A1 | 4/2020 | Touati et al. |
| 2020/0260241 A1 | 8/2020 | Sicard |

OTHER PUBLICATIONS

Dreiling, Ryan P., et al., "Electronic Subscriber Identity Module (ESIM) Transfer From Inactive Device," filed Oct. 28, 2019, U.S. Appl. No. 16/675,188.

Notice of Allowance dated Apr. 30, 2020, U.S. Appl. No. 16/665,941, filed Oct. 28, 2019.

Office Action dated Sep. 3, 2020, U.S. Appl. No. 16/933,989, filed Jul. 20, 2020.

Notice of Allowance dated Mar. 22, 2021, U.S. Appl. No. 16/933,989, filed Jul. 20, 2020.

Dreiling, Ryan P., et al., "Electronic Subscriber Identity Module (ESIM) Transfer From Inactive Device," filed Jul. 20, 2020, U.S. Appl. No. 16/933,989.

Notice of Allowance dated Jun. 18, 2021, U.S. Appl. No. 16/796,373, filed Feb. 20, 2020.

* cited by examiner

ELECTRONIC SUBSCRIBER IDENTITY MODULE (ESIM) TRANSFER VIA ACTIVATION CODE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices provide authentication information to cell sites when they attach to the radio access network to receive wireless communication services. This authentication information allows the wireless service provider to identify the mobile communication device and determine if the device has privileges for accessing its network. Sometimes this authentication information is stored on a subscriber identity module (SIM) that is installed into the mobile communication device. This may be referred to as a traditional SIM in some contexts. A traditional SIM is a smart card that can be installed into a first mobile communication device to provide the first device access to a radio access network. The traditional SIM can be removed from the first mobile communication device and installed into a second mobile communication device to provide the second device access to the radio access network. This may be referred to as 'pop-and-swap' in some contexts.

SUMMARY

In an embodiment, a method for sharing electronic subscriber identity module (eSIM) credentials between two mobile communication devices is described. The method comprises establishing, by a source user equipment (UE) comprising a first of the mobile communication devices, a data connection with a subscription manager data preparation (SMDP+) server associated with eSIM credentials stored at the source UE. The method further comprises notifying, by the source UE, the SMDP+ server of an intent to transfer the eSIM credentials. The method further comprises receiving, by the source UE, metadata describing an activation code containing identification data for the eSIM credentials. The method further comprises forwarding, by the source UE, the activation code to a destination UE comprising a second of the mobile communication devices. The activation code is forwarded to support a download of the eSIM credentials to the destination UE from the SMDP+ server.

In another embodiment, a method for sharing eSIM credentials between two mobile communication devices is described. The method comprises receiving, by a destination UE comprising a second of the mobile communication devices, an activation code containing identification data for eSIM credentials associated with a source UE comprising a first of the mobile communications devices. The method further comprises obtaining, by the destination UE, the identification data for eSIM credentials from the activation code. The method further comprises establishing, by the destination UE, a data connection with an SMDP+ server associated with the eSIM credentials based on the identification data for eSIM credentials. The method further comprises transmitting, by the destination UE, the identification data for eSIM credentials to the SMDP+ server. The method further comprises receiving, by the destination UE, the eSIM credentials from the SMDP+ server.

In yet another embodiment, a method for sharing eSIM credentials between two mobile communication devices is described. The method comprises establishing, by an SMDP+ server, a data connection with a source UE comprising a first of the mobile communication devices and containing eSIM credentials. The method further comprises receiving, by the SMDP+ server, a notification of intent to transfer the eSIM credentials. The method further comprises transmitting, by the SMDP+ server, metadata describing an activation code to the source UE, the activation code containing identification data for the eSIM credentials. The method further comprises establishing, by the SMDP+ server, a data connection with a destination UE comprising a second of the mobile communication devices. The method further comprises receiving, by the SMDP+ server, the identification data for the eSIM credentials from the destination UE. The method further comprises initiating, by the SMDP+ server, a download of eSIM credentials from the SMDP+ server to the destination UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
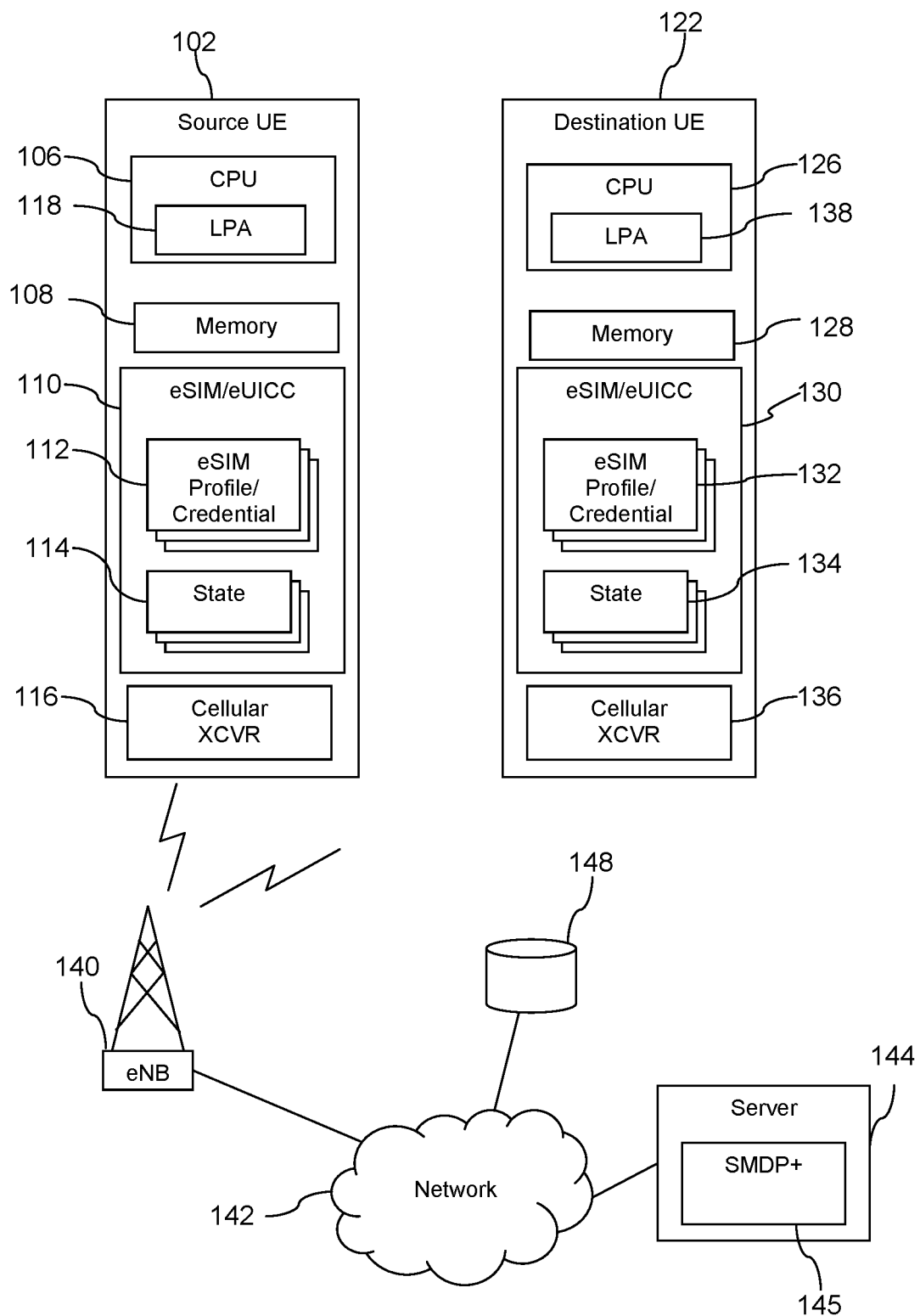
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user may wish to shift his or her wireless communication service from a first mobile communication device to a second mobile communication device. For example, a user may wish to shift wireless service upon upgrading from a first mobile phone to a second mobile phone. One mechanism for performing such a swap is a subscriber identity module (SIM) card. The SIM can be easily removed from one mobile communication device and inserted into another using a so called pop-and-swap technique. However, some mobile communication devices are now omitting the removable SIM and replacing it with an eSIM. The eSIM provides confidential information for authenticating into a radio access network (RAN) but is not removable by the user. eSIMs can be condensed to be smaller than SIMs, and hence provide certain technological benefits when designing a mobile communication device.

However, the inclusion of this technological solution leads to certain technological problems. Specifically, employing eSIMs may reduce the simplicity of transferring wireless communication service between mobile communication devices as eSIM hardware is not removable. A mobile communication device may also be referred to herein as a user equipment (UE) for clarity of discussion. Accordingly, eSIMs may give rise to technological problems in that a wireless operator may wish to allow a user to initiate an eSIM transfer between UEs while providing a secure environment for such transfers in order to reduce/prevent instances of unauthorized access by third parties and unauthorized access by the user. Specifically, the wireless operator may wish to secure such a transfer to prevent an unauthorized third party from stealing access from the user and/or spoofing the user's access on a third party device. In addition, the wireless operator may wish to secure such a transfer to prevent an authorized user from using a subscription for wireless services in an unauthorized manner, such as by obtaining simultaneous access to the RAN from more than one UE. A further technological challenge is that providing a secure peer-to-peer environment for exchanging eSIM credentials is difficult as a secure peer-to-peer environment gives rise to complex security protocols managed by the UEs. Managing such complex security protocols at the UE can employ significant processing resources, network communication resources, and/or memory resources.

The present disclosure teaches a system and method that provides a technical solution for the technical problem of securely transferring eSIM credentials from a source UE to a destination UE. In general, the present disclosure teaches a mechanism for using the wireless operator's network to broker an eSIM exchange between a source UE and a destination UE. This approach allows a user to initiate the eSIM exchange, while also allowing the network to manage a significant portion of the network security protocols. Hence, the disclosed embodiments allow a user initiated eSIM exchange process while reducing processor, network communication, and/or memory resource usage at the source/destination UE by allowing the network to manage such security concerns. Accordingly, the source/destination UE can allocate such hardware resources to other matters, and hence can operate more efficiently.

Further, the disclosed embodiments employ a mechanism of providing an activation code to a source UE. The source UE then provides the activation code to a destination UE, either via display of a quick response (QR) code or transfer of the activation code via a wireless interface (e.g., via text, email, etc.). This approach mitigates the possibility of unauthorized network usage due to spoofing by a third party and/or unauthorized access by the user. Specifically, displaying a QR code at a source UE and scanning the QR code at a destination UE ensures that a user is in physical possession of both devices. As such, a third party would be unable to initiate a transfer of the eSIM credentials to an unauthorized device and/or intercept the eSIM credentials in transit without physical access to one or both UEs. Wirelessly transmitting the activation code would rely on communications protocols for such security. In addition, the source device may delete the eSIM credentials and/or disable the eSIM credentials by placing them in an inactive state, depending on the embodiment. This may prevent a user from using the eSIM credentials on more than one device, which would exceed the user's authorized access to the network. It should also be noted that the disclosed embodiments involve interaction with the network to support an eSIM credential transfer. As such, the disclosed embodiments provide additional security when compared to the SIM pop-and-swap method, which can be accomplished completely by any party with physical access to the source UE. Accordingly, the disclosed embodiments provide increased security for the source and destination UEs as well as a reduction in processor, communication, and memory resources during an eSIM transfer.

For example, a user may employ a user interface (UI) to access a local profile assistant (LPA) at the source UE to initiate an eSIM transfer. The source UE originally received a set of eSIM credentials from an SMDP+ server. The LPA at the source UE contacts the same SMDP+ server to initiate the eSIM transfer in response to the user input. The LPA at the source UE indicates a handle notification state to the SMDP+ server of transfer pending to indicate the intention to transfer the eSIM credentials. Depending on the embodiment, the LPA at the source UE can deactivate the eSIM credentials by either deleting the eSIM credentials locally or disabling the eSIM credentials by placing the eSIM credentials in a deactivated state. Placing the eSIM credentials in a deactivated state may reduce communication resource usage in use cases that contemplate repeated exchanges of eSIM credentials between UEs, for example when a user swaps between a work phone and a personal phone. Regardless of the embodiment, deactivating the eSIM credentials prevents a user from using eSIM credentials to access the RAN from both UEs at the same time. In some embodiments, the source UE can notify the SMDP+ server that the eSIM credentials have been successfully deactivated.

The SMDP+ server can generate an updated matching identifier (ID) for the eSIM profile in expectation of the eSIM transfer. The SMDP+ server can also generate metadata that describes an activation code for the eSIM credentials. For example, the metadata can indicate a fully qualified domain name (FQDN) address for the SMDP+ server, the matching ID, and/or a user defined code known to the user. The SMDP+ server can then send the metadata to the source UE.

The LPA on the source UE interprets the metadata and generates the activation code. In some examples, the activation code is a QR code. In this case, the source UE displays the QR code for scanning by the destination UE. In other embodiments, the activation code is sent to the destination UE via a wireless interface, such as via text messaging, via email, short range radio (e.g., BLUETOOTH, near field communication (NFC)), etc. An LPA at the destination UE interprets the activation code to obtain the FQDN address for the SMDP+ server, the matching ID for the eSIM profile, and/or the user defined code. The user defined code from the activation code may be referred to herein as the signaled user defined code for clarity of discussion. The LPA at the destination UE can then prompt the user to input a user defined code. If the input user defined code at the destination UE matches the signaled user defined code, the authorized user is in possession of the destination UE and the transfer can proceed. In some examples, the user defined code is a personal identification number (PIN). The destination UE can then employ the FQDN address to contact the SMDP+ server and employ the matching ID to authenticate an eSIM credential download from the SMDP+ server. Once the request for the eSIM credential download is validated, the SMDP+ server can instruct the destination UE to download the eSIM credentials. Once downloaded, the destination UE can employ the eSIM credentials to access the RAN, while the source UE can no longer access the RAN due to the deleted/disabled eSIM credentials at the source UE. As noted above, this example employs the network as a broker, and hence allows the source UE and the destination UE to avoid secure peer-to-peer communication. This in turn reduces processing, memory, and/or communication resource usage at the source and/or destination UEs.

Turning now to FIG. 1, a communication system 100 is described. In an embodiment, the system 100 comprises a source UE 102 including a first mobile communication device and a destination UE 122 including a second mobile communication device. The source UE 102 may be a mobile phone, a smart phone, a personal digital assistant (PDA), a headset computer, a wearable computer, a laptop computer, a notebook computer, a tablet computer, or other device capable of connecting to a RAN. The destination UE 122 may also be a mobile phone, a smart phone, a personal digital assistant (PDA), a headset computer, a wearable computer, a laptop computer, a notebook computer, a tablet computer, or other device capable of connecting to a RAN. In an embodiment, the source UE 102 and the destination UE 122 may be different types of devices. For example, in an embodiment, the source UE 102 may be a mobile phone and the destination UE 122 may be a smart phone. For example, in an embodiment, the source UE 102 may be a mobile phone and the destination UE 122 may be a laptop computer.

The source UE 102 may comprise a processor 106, a memory 108, an eSIM 110 storing one or more sets of eSIM credentials 112 and storing one or more eSIM state registers 114, and a cellular radio transceiver 116. In an embodiment, the number of different sets of eSIM credentials 112 in the eSIM 110 is the same as the number of eSIM state registers 114. In an embodiment, the eSIM 110 is configured to store up to five different sets of eSIM credentials 112 and up to five different eSIM state registers 114. The source UE 102 may also comprise a LPA 118 which operates on the processor 106, in a non-transitory portion the memory 108, or both. The LPA 118 is a client side program capable of communicating with an SMDP+ application 145 operating on a server 144 for the purpose of managing eSIM 110. For example, the LPA 118 may manage eSIM 110 on the client side based on instructions from the SMDP+ application 145. Further, the LPA 118 may forward data regarding eSIM 110 to the SMDP+ application 145 to support maintaining an accurate awareness of the state of the eSIM 110 on the network side. It should be noted that an eSIM 110 may be loaded onto, and hence referred to, as an embedded universal integrated circuit card (eUICC). Further, eSIM credentials 112 may also be referred to as eSIM profile(s).

The destination UE 122 comprises a processor 126, a memory 128, an eSIM 130 capable of storing one or more sets of eSIM credentials 132 and storing an eSIM state register 134, and a cellular radio transceiver 136. The destination UE 122 may also comprise an LPA 138 which operates on the processor 126, in a non-transitory portion of the memory 128, or both. The destination UE 122 may be substantially similar to the source UE 102. For example, the source UE 102 may be a work phone issued to a user by the user's employer while the destination UE 122 is a personal phone owned by the user. In another example, the source UE 102 may be an older model phone and the destination UE 122 may a newer model of phone the user has received as part of an upgrade cycle.

The system 100 further comprises a cell site 140, a network 142, a computer system (e.g., a server) 144 that executes an SMDP+ application 145, and a data store 148. The UEs 102, 122 are designed to communicate with the network 142 via the cell site 140 by using cellular radio transceivers 116 and 136.

The cell site 140 and at least a portion of the network 142 provides wireless communication service according to at least one of a fifth generation (5G) 3rd Generation Partnership Project (3GPP) network, a fourth generation (4G) 3GPP network, a long term evolution (LTE) network, a code division multiple access (CDMA) protocol, a global system for mobile communications (GSM) protocol, a worldwide interoperability for microwave access (WiMAX) telecommunication protocol, or other wireless cellular data communication based technologies. The network 142 comprises one or more public networks, one or more private networks, or a combination thereof. While a single cell site 140 is shown in FIG. 1, it is understood that the system 100 may comprise any number of cell sites 140. While two UEs 102, 122 are shown in FIG. 1, it is understood that the system 100 may comprise any number of UEs and corresponding mobile communication devices.

The UEs 102, 122 may exchange messages with the cell site 140 to authenticate into a RAN and to receive cellular wireless communication service from the cell site 140 and/or other cell sites. Part of the authentication process comprises the UEs 102, 122 providing at least some of the eSIM credentials 112, 132 to the cell site 140. In an embodiment, a set of eSIM credentials 112, 132 comprises one or more of a universal integrated circuit card identity (UICCID), an international mobile subscriber identity (IMSI), mobile station integrated service digital network identity (MSISDN), and/or mobile dialing number (MDN). The eSIM credentials 112, 132 may comprise one or more network authentication values, credentials, and keys, for example a Ki value. As such, obtaining eSIM credentials 132 using an activation code for eSIM credentials 112 allows the destination UE 122 to access the RAN using a service subscription originally associated with the source UE 102. Further, deactivating eSIM credentials 112 at the source UE 102 upon (e.g., prior to) downloading eSIM credentials 132 at the destination UE 122 ensures that the source UE 102 cannot access the RAN when such access is given to the destination UE 122 and vice versa.

In an embodiment, the eSIMs 110, 130 may further comprise applications for attaching to different networks. In an embodiment, the eSIMs 110, 130 may further comprise applications for pairing, locking, provisioning, and other activities. The eSIMs 110, 130 may comprise a mobile username and a mobile Internet Protocol (IP) password. The eSIMs 110, 130 may comprise a domain name. In an embodiment, a set of eSIM credentials 112 may be about 100 kbytes in size to about 200 kbytes in size. In another embodiment, the eSIM credentials 112 may be about 75 kbytes in size to about 500 kbytes in size.

The SMDP+ application 145 is a component configured to create, generate, manage, and protect of eSIMs 110 and 130. Specifically, the SMDP+ application 145 is responsible for managing the life cycle of the eSIMs 110 and 130. For example, the SMDP+ application 145 is configured to control downloads of bound profile packages containing eSIMs 110 and 130. A bound profile package is a downloadable package containing data directed to a particular eUICC on a corresponding UE 102 or 122. A bound profile package is protected by a key agreement between the SMDP+ application 145 and the corresponding UE 102 or 122 to ensure only the correct UE 102 or 122 can access the eSIM 110 and/or 130. Further, the SMDP+ application 145 is configured to validate identification data for eSIM credentials 112 and 132 in order to verify that a requesting device is authorized to receive an eSIM 110 and 130.

Figure 2:
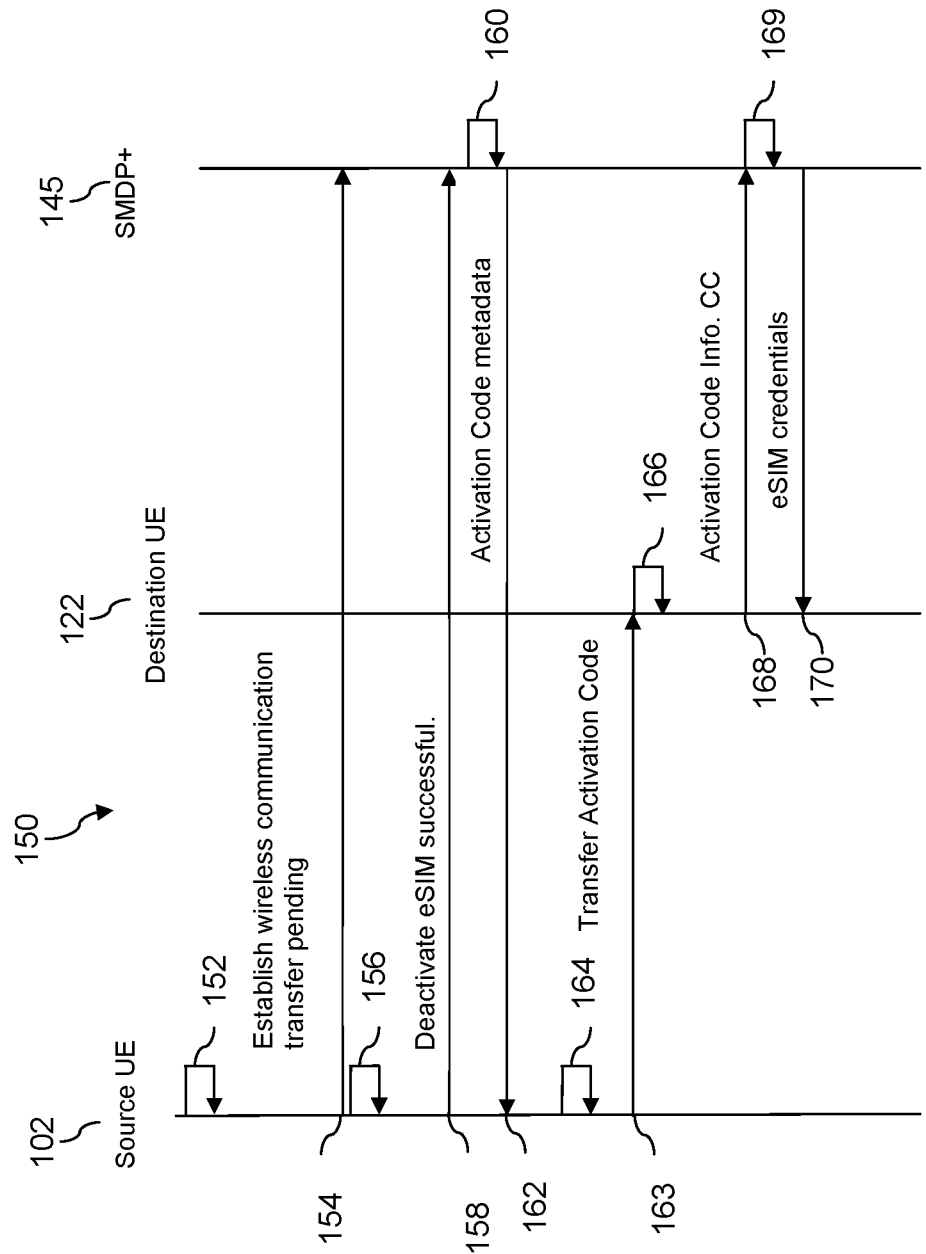
FIG. 2 is a message sequence diagram of an eSIM transfer between UEs via an activation code according to an embodiment of the disclosure.

Turning now to FIG. 2, a message sequence 150 is described. In an embodiment, the message sequence 150 supports an eSIM transfer between a source UE 102 and a destination UE 122 via an activation code. The message sequence 150 operates between a source UE 102, a destination UE 122, and an SMDP+ application 145, for example via a network 142 as shown in FIG. 1. Prior to initiating message sequence 150, the source UE 102 has downloaded eSIM credentials 112 from SMDP+ application 145. Such eSIM credentials 112 are stored in an eSIM 110. The eSIM credentials 112 may also be placed in an active state by eSIM state registers 114, in some embodiments. Accordingly, the source UE 102 is capable of accessing the RAN per a user's subscription agreement. The source UE 102 may also contain any data desirable to be authenticated by the SMDP+ application 145, such as an ICCID of the source UE 102, an embedded universal integrated circuit card identifier (EID) of the source UE 102, a matching ID associated with the eSIM credentials 112, a signaled user defined code previously set by the user, etc.

At label 152 a user employs a UI to access a LPA 118 at the source UE 102 in order to initiate an eSIM transfer. The UI can include a touchscreen, keypad, or other interface. For example, the user can select a menu item that describes the process, such as a menu item with text indicating 'Transfer Profile to Different Device' or other language. At label 154, the LPA 118 at the source UE 102 contacts the SMDP+ application 145 responsible for managing the eSIM 110 to initiate an eSIM transfer in response to the user input at label 152. The LPA 118 can connect to the SMDP+ application 145 via an eSIM management (ES) protocol, for example via an ES number five (ES5+) and/or an ES number nine (ES9+) interface. The SMDP+ application 145 can validate the source UE 102 by requesting and receiving relevant identifying credentials (e.g., source UE 102 EID, matching ID for the eSIM credentials, etc.) For example, this may occur according to a mutual authentication process that utilizes a Global System for Mobile Communications Association (GSMA) issued client and server certificate exchange and corresponding validation. The LPA 118 at the source UE 102 may then communicate with the SMDP+ application 145 by sending a handle notification state change. For example, the LPA 118 at the source UE 102 can send a handle notification state of 'transfer pending' to the SMDP+ application 145 in order to indicate an intention to transfer the eSIM credentials to another device. It should be noted that the source UE 102 may not specify the destination UE 122 that is to receive the new eSIM credentials. The source UE 102 may merely note that a transfer is to occur. This allows the user to manage the eSIM transfer rather than requesting that the SMDP+ application 145 target a specific destination UE 122. This also allows the user to perform an eSIM transfer without entering data specific to the destination UE 122.

At label 156, the LPA 118 deactivates the eSIM credentials at the source UE 102. In one embodiment, deactivating the eSIM credentials includes deleting the eSIM credentials from local memory. Deleting the eSIM credentials may be employed for a one time UE upgrade and/or based on network policy. In another embodiment, deactivating the eSIM credentials includes disabling the eSIM credentials by placing the eSIM credentials in a deactivated state. Placing the eSIM credentials in a deactivated state is an optional feature that may reduce communication resource usage in use cases that contemplate repeated exchanges of eSIM credentials between UEs, for example when a user swaps between a work phone and a personal phone. Some UEs may not be equipped with such eSIM state functionality and hence disabling and retaining eSIM credentials is optional. Regardless of the embodiment, deactivating the eSIM credentials prevents a user from using eSIM credentials to access the RAN after the destination UE 122 receives corresponding eSIM credentials. As such, deactivating the eSIM credentials ensures the user does not gain unauthorized access by accessing the RAN from both UEs at the same time. At label 158 the source UE 102 can notify the SMDP+ application 145 that the eSIM credentials have been successfully deactivated. In the event that the message of label 158 is omitted, the SMDP+ application 145 can rely on the source UE 102 to deactivate the eSIM credentials 112. When label 158 is used, the SMDP+ application 145 can refuse to extend new eSIM credentials for other devices until the source UE 102 confirms the old eSIM credentials 112 at the source UE 102 are no longer usable. The steps of label 158 may ensure the eSIM credentials/profile 112 has been deleted or deactivated from the source UE 102, before the SMDP+ application 145 platform delivers the same eSIM profile/credentials 112 to the destination UE 122, which may prevent two UEs from accessing the network through the same profile.

At label 160, the SMDP+ application 145 can generate an updated (e.g., new) matching ID for the eSIM profile in expectation of the eSIM credentials 112 transfer. As a new matching ID is created, the original matching ID for the source UE 102 cannot be reused to re-download the eSIM to the source UE 102. This assists in ensuring the source UE 102 cannot reclaim access to the RAN while such access is used by the destination UE 122. The SMDP+ application 145 can also generate metadata that describes an activation code for the eSIM credentials. For example, the metadata can indicate a FQDN address for the SMDP+ application 145, the new matching ID, and/or a user defined code known to the user, such as a PIN or other password set by the user. As an example, a GSMA confirmation code, as described in official document SGP.22 specification, can be used as a user defined code. The SMDP+ application 145 can then send the metadata to the LPA 118 at the source UE 102 at label 162, for example by employing an ES9+ interface.

The LPA 118 on the source UE 102 receives and interprets the activation code metadata at label 164 and generates the activation code based on the metadata. The source UE 102 then transfers the activation code to the destination UE 122 at label 163. In some examples, the activation code is a QR code. In this case, the source UE 102 transfers the activation code by displaying the QR code. The destination UE 122 can then scan the QR code from the source UE 102 display, for example by employing a camera. For example, the QR code can visually encode data by white and black patterns. As such, the destination UE 122 can analyze the QR code to recover the relevant eSIM related data to support obtaining access to the eSIM credentials 132 from the SMDP+ application 145. In other embodiments, the activation code is a file that contains the relevant eSIM related data, which is transferred to the destination UE via a wireless interface, such as via text messaging, via email, etc. In this case, the activation code can be forwarded between devices via the RAN and/or via a peer-to-peer connection.

An LPA 138 at the destination UE 122 receives and interprets the activation code at label 166 to obtain the FQDN address for the SMDP+ application 145, the new/updated matching ID for the eSIM profile, and/or any other information desired to support validation of the destination UE 122 by the SMDP+ application 145. The LPA 138 at the destination UE 122 can also prompt the user to input a user defined code as part of label 166. The LPA 138 at the destination UE 122 can then receive an input user defined code from the user and forward the input user defined code to the SMDP+ application 145. If the input user defined code at the destination UE 122 matches the user defined code, the authorized user is in possession of the destination UE 122 and the transfer can proceed. This security feature provides another safeguard to prevent an unauthorized user from stealing access away from the source UE 102, for example in the event that the source UE 102 is stolen. In such a case, service cannot be separated from the source UE 102 without knowledge of the user defined code. Hence, the disclosed transfer protocol provides greater security than a hardware SIM that can be swapped by anyone with physical possession of the source UE 102.

At label 168, the destination UE 122 can employ the FQDN address to contact the correct SMDP+ application 145 that is responsible for managing the eSIM credentials 112 from the source UE 102, for example via an ES9+ link. The destination UE 122 can also send the matching ID and user defined code to authenticate an eSIM credential 132 download from the SMDP+ application 145. Specifically, the destination UE 122 sends the new/updated matching ID received by the source UE 102 from the SMDP+ application 145 at labels 162/164 as part of a request for the eSIM credentials 132 at label 168. The matching ID allows the SMDP+ application 145 to match the eSIM credentials 112 from the source UE 102 with the destination UE 122. The destination UE 122 can also send any relevant data related to the destination UE 122 to support transfer of the eSIM credentials 132, such as the EID of the destination UE 122. At label 169, the SMDP+ application 145 can employ the matching ID and the user defined code to validate the request to activate the eSIM credentials 132 at the destination UE 122. Further, the SMDP+ application 145 can assign the eSIM credentials 112 from the source UE 102 to the destination UE 122 (e.g., based on destination UE 122 EID) in a database/table (e.g., data store 148) at the SMDP+ application 145 for future validation.

Once the request for the eSIM credential 132 download is validated, the SMDP+ application 145 can instruct the destination UE 122 to download the eSIM credentials 132 at label 170. In some examples, the eSIM credentials 132 may be placed in an active state and/or reactivated from a deactivated state (e.g., without a download) if the eSIM credentials 132 have been previously downloaded and deactivated as part of a previous eSIM transfer. Once downloaded, the destination UE 122 can employ the eSIM credentials 132 to access the RAN, while the source UE 102 can no longer access the RAN due to the deleted/disabled eSIM credentials 112 at the source UE 102. This embodiment employs the network and the SMDP+ application 145 as a broker, and hence allows the source UE 102 and the destination UE 122 to avoid secure peer-to-peer communication. This in turn reduces processing, memory, and/or communication resource usage at the source and/or destination UEs 102, 122 over direct peer-to-peer transfer mechanisms.

Figure 3:
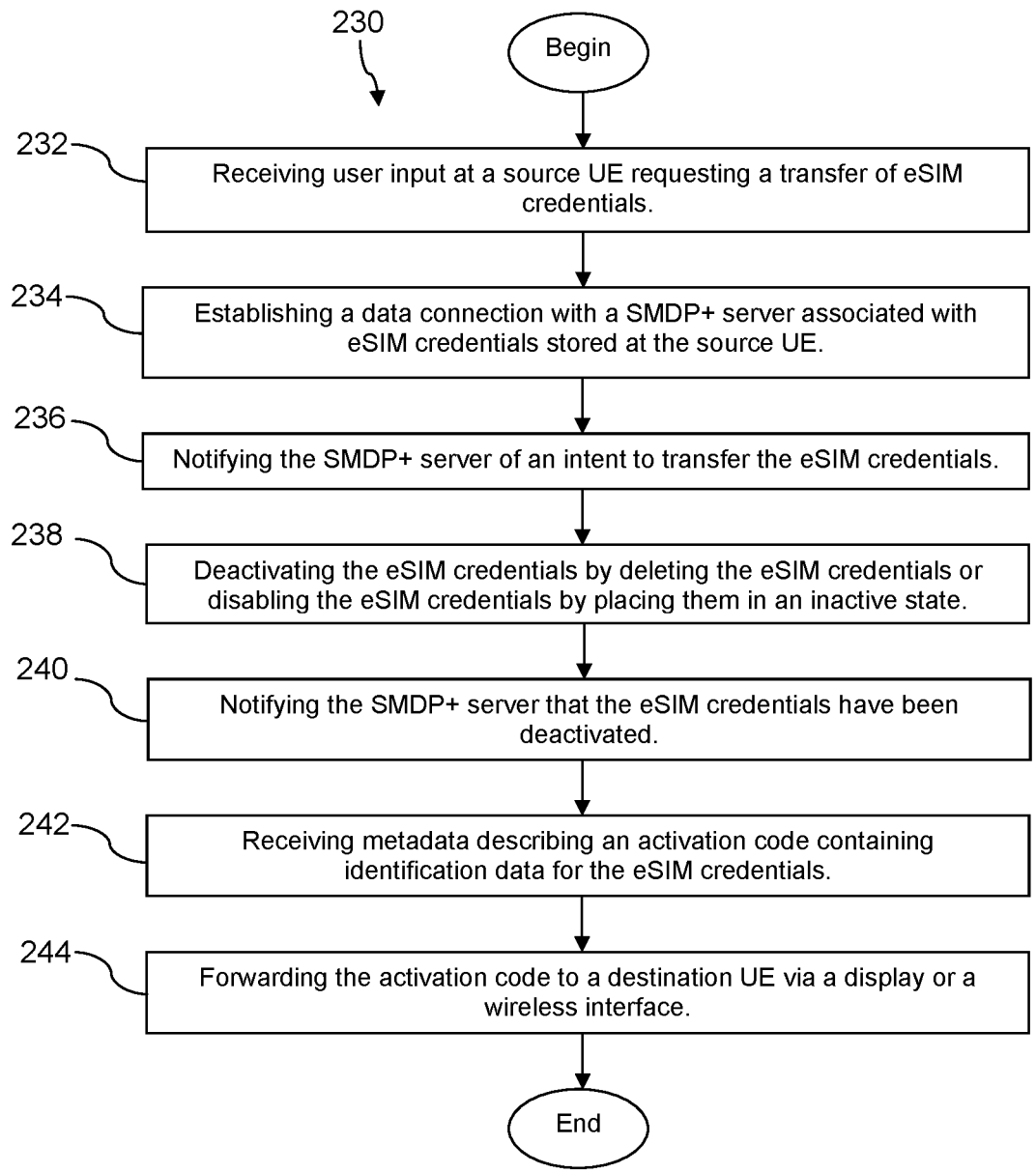
FIG. 3 is a flow chart of a method of transferring eSIM credentials receiving eSIM credentials at a destination UE according to an embodiment of the disclosure.

Turning now to FIG. 3, a method 230 is described. In an embodiment, the method 230 supports transferring eSIM credentials 112 from a source UE 102 toward a destination UE 122, and hence sharing eSIM credentials 132 between two mobile communication devices. Prior to initiating method 230, the source UE 102 has downloaded eSIM credentials 112 from an SMDP+ server 144. Such eSIM credentials are stored in an eSIM 110. The eSIM credentials 112 may also be placed in an active state by eSIM state registers 114, in some embodiments. Accordingly, the source UE 102 is capable of accessing the RAN per a user's subscription agreement. The source UE 102 may also contain any data desirable to be authenticated by the SMDP+ server 144, such as an ICCID of the source UE 102, an EID of the source UE 102, a matching ID associated with the eSIM credentials 112, a signaled user defined code previously set by the user, etc.

At block 232, the LPA 118 at the source UE 102 receives user input requesting a transfer of eSIM credentials 112 to another device. Such input can be received via a UI at the source UE 102. Block 232 may occur prior to establishing the data connection with an SMDP+ server 144 as discussed below. For example, a user can activate a menu item through the UI that indicates 'Transfer Profile to a Different Device' or other language.

At block 234, the LPA 118 at the source UE 102 (e.g., comprising a first of the mobile communication devices) establishes a data connection with an SMDP+ server 144 associated with eSIM credentials 112 stored at the source UE 102. As noted above, this is the same SMDP+ server 144 from which the source UE 102 originally downloaded the eSIM credentials 112 upon activating access to the RAN.

At block 236, the LPA 118 at the source UE 102 can notify the SMDP+ server 144 of an intent to transfer the eSIM credentials 112, for example by transmitting a 'transfer-pending' handle notification state to the SMDP+ server 144.

At block 238, the LPA 118 at the source UE 102 can deactivate the eSIM credentials 112 in local memory. In one embodiment, the LPA 118 at the source UE 102 can delete the eSIM credentials 112 after notifying the SMDP+ server 144 of the intent to transfer the eSIM credentials 112. In another embodiment, the LPA at the source UE can disable the eSIM credentials by placing the eSIM credentials in an inactive state after notifying the SMDP+ server of the intent to transfer the eSIM credentials. It should be noted that the LPA may wait until after block 236 to deactivate the eSIM credentials. Specifically, the SMDP+ server may validate the transfer request in response to block 236. Hence, the LPA at the source UE can ensure the request to transfer has been validly received and agreed to by the SMDP+ server prior to deactivating the eSIM credentials to avoid removing the source UE from the RAN while denying access to the destination UE to access the RAN.

At block 240, the LPA 118 at the source UE 102 may notify the SMDP+ server 144 that the eSIM credentials 112 have been deactivated. This may occur prior to receiving metadata describing an activation code containing identification data for the eSIM credentials 112 as discussed below. Block 240 may ensure the SMDP+ server 144 does not begin the process of transferring the eSIM credentials 112 until the source UE 102 notifies the SMDP+ server 144 that the eSIM credentials 112 have been deactivated. Accordingly, block 240 may be used to ensure the eSIM credentials/profile 112 has been deleted or deactivated, before the SMDP+ platform/server 144 delivers the same eSIM credentials/profile 112 to the destination UE 102, thereby preventing two UEs accessing the network through the same profile. In response to block 240, the SMDP+ server 144 may prepare the eSIM profile 112 and place the eSIM profile 112 into a state where the eSIM profile 112 can be linked to a newly generated matching ID and/or activation code. The eSIM profile 112 can then be placed into a released state to allow the eSIM profile 112 to be downloaded by the destination UE 122.

At block 242, the LPA 118 at the source UE 102 receives metadata describing an activation code containing identification data for the eSIM credentials 112. For example, the metadata can include a FQDN address of the SMDP+ server 144, a matching ID associated with the eSIM credentials 112, a user defined code associated with a user, or combinations thereof. The LPA 118 at the source UE 102 can then generate an activation code based on the metadata. Accordingly, the activation code can also include a FQDN address of the SMDP+ server 144, a matching ID associated with the eSIM credentials 112, a user defined code associated with a user, or combinations thereof.

At block 244, the LPA 118 at the source UE 102 can forward the activation code to a destination UE 122 (e.g., comprising a second of the mobile communication devices). The activation code is forwarded to the destination UE 122 in order to support a download of the eSIM credentials 132 to the destination UE 122 from the SMDP+ server 144. In one example, the activation code is a QR code that encodes the FQDN address of the SMDP+ server 144, the matching ID associated with the eSIM credentials 132, the user defined code associated with a user, etc. In this case, forwarding the activation code to the destination UE 122 includes displaying the QR code on a display at the source UE 102. The QR code can then be read by a camera or other scanner at the destination UE 122. In another example, the activation code can include a data file containing the FQDN address of the SMDP+ server 144, the matching ID associated with the eSIM credentials 112, the user defined code associated with a user, etc. In this case, forwarding the activation code to the destination UE 122 can include transmitting the activation code to the destination UE 122 via a wireless interface, such as via a RAN and/or via a peer-to-peer wireless interface (e.g., a BLUETOOTH interface (Institute of Electrical and Electronics Engineers standard 802.15.1), near field communication (NFC), radio frequency identifier (RFID) interface, etc.)

Figure 4:
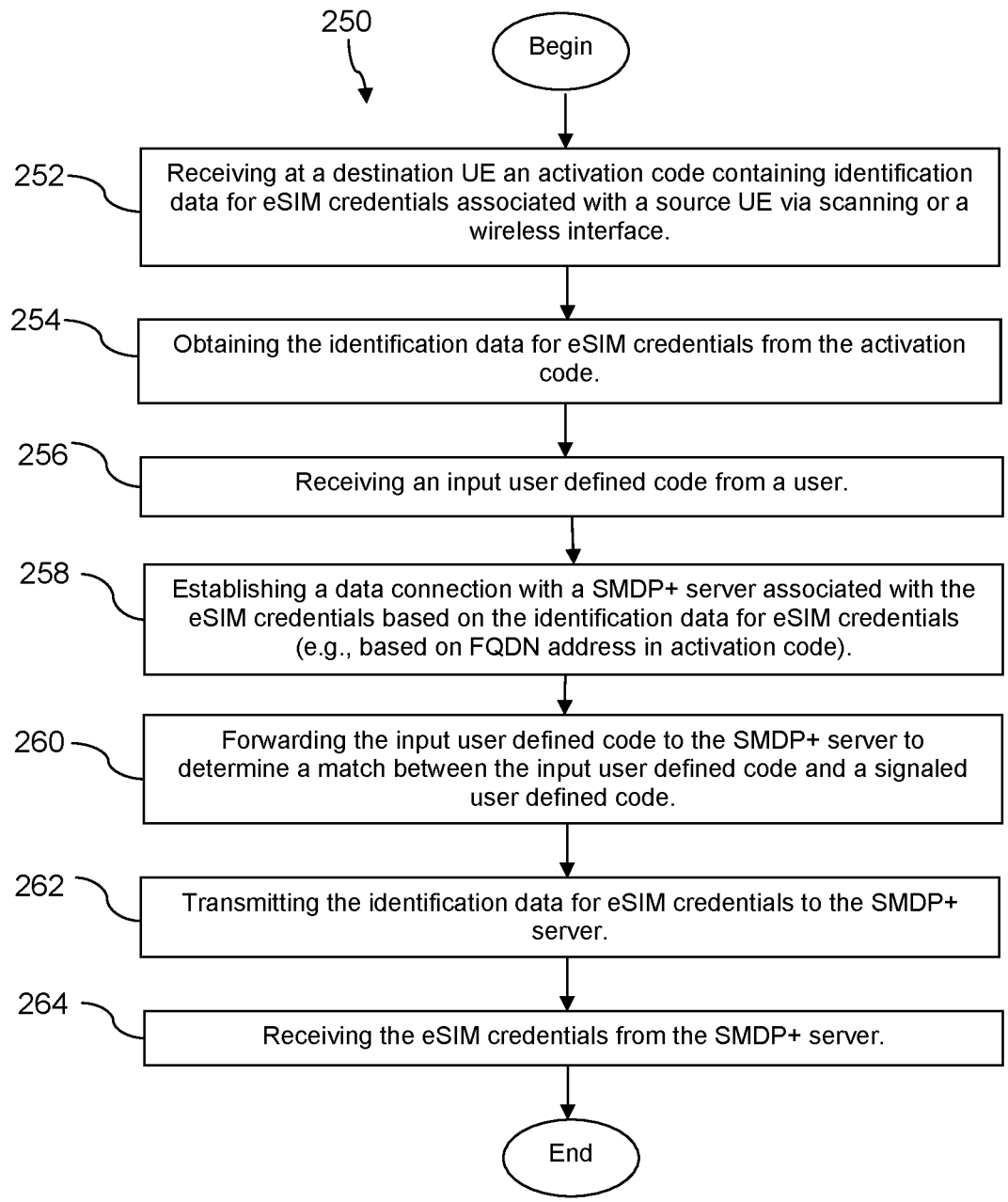
FIG. 4 is a flow chart of a method of receiving eSIM credentials at a destination UE according to an embodiment of the disclosure.

Turning now to FIG. 4, a method 250 is described. In an embodiment, the method 250 supports receiving eSIM credentials 132 at a destination UE 122, and hence between mobile communication devices. Method 250 may initiate in response to method 230.

At block 252, an activation code is received by an LPA 138 at a destination UE 122 comprising a second of the mobile communication devices. The activation code contains identification data for eSIM credentials 112 associated with a source UE 102 comprising a first of the mobile communications devices. In some embodiments, the activation code is a QR code. In such a case, receiving the activation code includes scanning the QR code from a display at the source UE 102. In some embodiments, the activation code is a data file. In such cases, the activation code is received via a wireless interface at the destination UE 122.

At block 254, the LPA 138 obtains identification data for eSIM credentials 132 from the activation code. For example, the activation code can include a FQDN address of an SMDP+ server 144, a matching ID associated with the eSIM credentials 132, a signaled user defined code, and/or any other data desired to authenticate the destination UE 122 when communicating with the SMDP+ server 144 that manages the eSIM 130.

At block 256, an input user defined code is received from a user. For example, the LPA 138 can prompt the user to enter an input user defined code into a UI. As a specific example, the activation code may contain a boolean value indicating if a confirmation code validation is required (e.g., true/false) in order to complete the eSIM profile download 132. As such, block 256 may occur based on the activation code. At block 258, the LPA 138 at the destination UE 122 can establish a data connection with the SMDP+ server 144 associated with the eSIM credentials 132 based on the identification data for the eSIM credentials 132 as obtained in the activation code. For example, the LPA 138 may employ the FQDN address of the SMDP+ server 144 obtained from the activation code to establish the data connection with the correct SMDP+ server 144.

The LPA 138 at the destination UE 122 can forward the input user defined code to the SMDP+ server 144 at block 260. This allows the SMDP+ server 144 to perform validation of the input user defined code. Validation of input user defined code is a security mechanism to ensure the user is managing the transfer and not an unauthorized third party. Hence, the method 250 may not proceed if the user defined code is not validated/verified.

At block 262, the LPA 138 at the destination UE 122 can transmit the identification data for eSIM credentials 132, as received in the activation code, to the SMDP+ server 144. For example, the identification data for eSIM credentials 132 can include a matching ID associated with the eSIM credentials 132 to support matching the destination UE 122 to the correct eSIM credentials 132. The identification data for eSIM credentials 132 sent to the SMDP+ server 144 can also include any other data desired to validate the destination UE 122. Such data can include an EID of the source UE 102 and/or the destination UE 122, the user defined code, the matching ID, etc.

At block 264, the LPA 138 at the destination UE 122 receives the eSIM credentials 132 from the SMDP+ server 144. For example, the SMDP+ server 144 can direct the LPA 138 at the destination UE 122 to download a package containing the eSIM credentials 132. The LPA 138 can then install the eSIM credentials 132 and then employ the eSIM credentials 132 to allow the destination UE 122 to access the RAN in place of the source UE 102.

Figure 5:
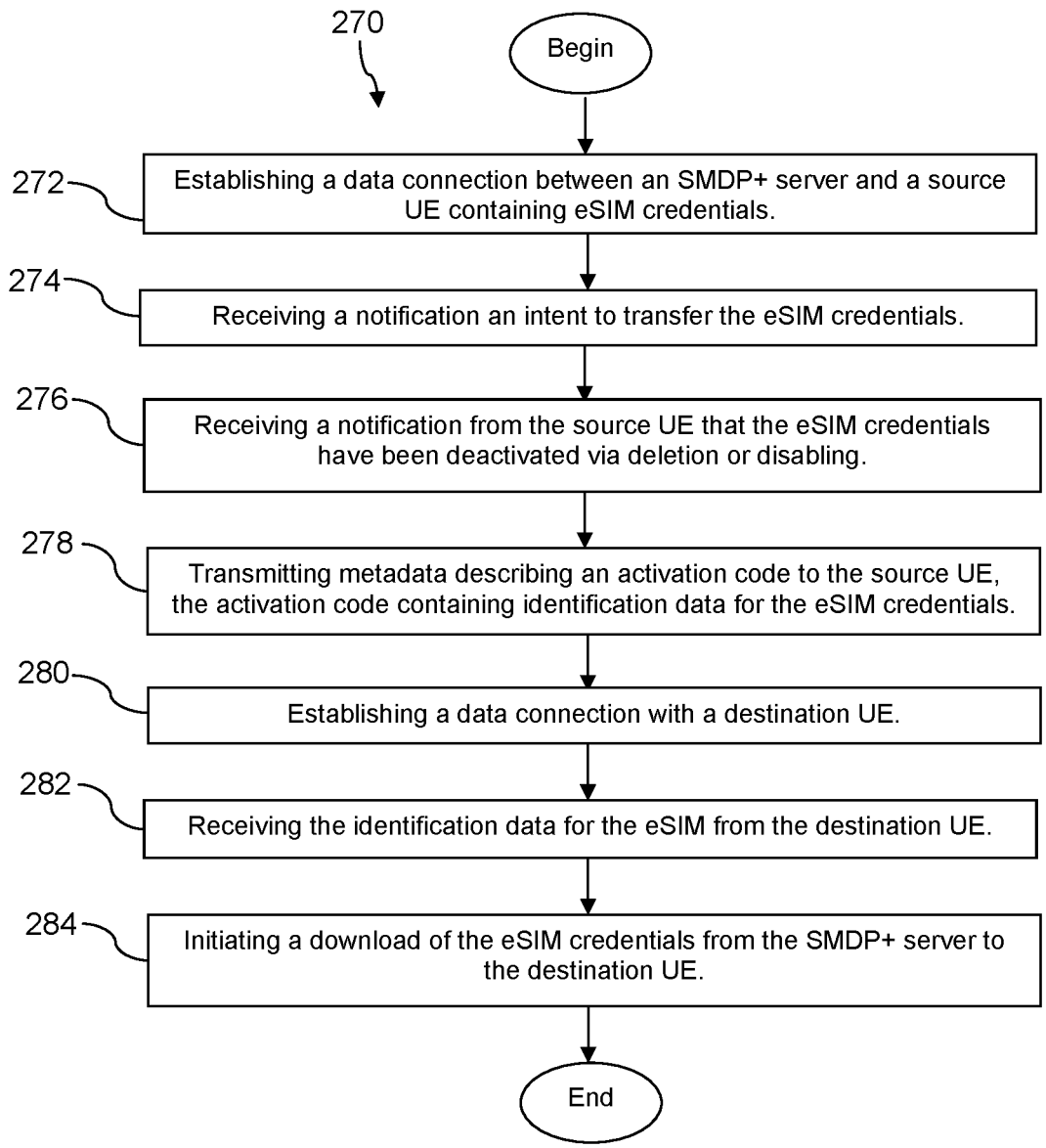
FIG. 5 is a flow chart of a method of managing a transfer of eSIM credentials between a source UE and a destination UE by an SMDP+ server according to an embodiment of the disclosure.

Turning now to FIG. 5, a method 270 is described. In an embodiment, the method 270 supports managing a transfer of eSIM credentials between a source UE 102 and a destination UE 122 by an SMDP+ application 145, and hence between mobile communication devices. Method 270 may initiate in response to methods 230 and 250.

At block 272, the SMDP+ server establishes a data connection with a source UE comprising a first of the mobile communication devices and containing eSIM credentials. The SMDP+ server may validate the source UE. The SMDP+ server then receives a notification of an intent to transfer the eSIM credentials from the source UE at block 274. For example, the intent to transfer the eSIM credentials can be received as part of a 'transfer-pending' handle notification state. In one embodiment, the notification of the intent to transfer the eSIM credentials indicates the eSIM credentials are queued for deletion on the source UE. In another embodiment, the notification of the intent to transfer the eSIM credentials can indicate that the eSIM credentials are queued for disabling on the source UE by placing the eSIM credentials in an inactive state.

At block 276, the SMDP+ server can receive a notification from the source UE that the eSIM credentials have been deactivated via deletion or disabling. This may occur prior to transmitting metadata describing an activation code containing identification data for the eSIM credentials as described below. Specifically, the SMDP+ server can wait to receive the notification at block 276 before proceeding with the rest of the method 270. This supports ensuring that the eSIM credentials are not used on more than one UE at a time.

At block 278, the SMDP+ server generates and transmits metadata describing an activation code to the source UE. The activation code contains identification data for the eSIM credentials. The activation code can include a FQDN address of the SMDP+ server, a new matching ID associated with the eSIM credentials and generated for use upon eSIM transfer, a user defined code associated with a user, and/or other data desired to validate a destination UE. In some embodiments, the activation code is a QR code. In such a case, the metadata describing the activation code supports generating the QR code for display at the source UE and scanning at the destination UE. In some embodiments, the activation code is a data file. In such cases, the metadata describing the activation code supports generating the data file for wireless transmission between the source UE and the destination UE.

At block 280, the SMDP+ server establishes a data connection with a destination UE comprising a second of the mobile communication devices. The SMDP+ server can then receive the identification data for the eSIM credentials from the destination UE at block 282. For example, the identification data for the eSIM credentials can include the new matching ID sent to the source UE at block 278. This supports matching a request to obtain eSIM credentials from the destination UE with the corresponding eSIM profile and credentials. The identification data for the eSIM credentials can also contain a user defined code to verify the user is managing the eSIM transfer. The identification data for the eSIM credentials can also contain an EID of the source UE and/or the destination UE as well as any other data desired to validate the destination UE and manage the reassignment of the eSIM credentials from the source UE to the destination UE in a corresponding data store.

Once the eSIM credentials have been reassigned, the SMDP+ server can initiate a download of the eSIM credentials to the destination UE from the SMDP+ server at block 284. The destination UE can then employ the eSIM credentials to access the RAN upon completing the download and performing a corresponding package installation.

Figure 6:
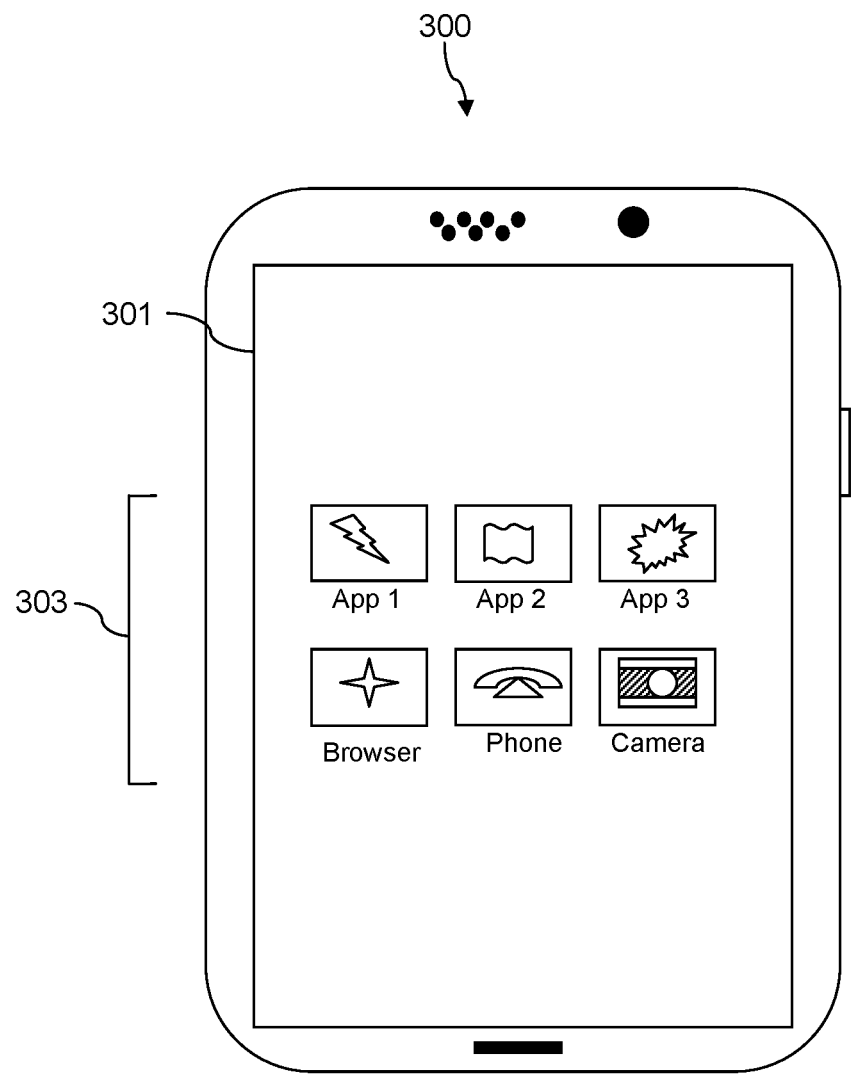
FIG. 6 is an illustration of a mobile communication device according to an embodiment of the disclosure.

FIG. 6 depicts the UE 300, which is operable for implementing aspects of the present disclosure, but the present disclosure should not be limited to these implementations. Though illustrated as a mobile phone, the UE 300 may take various forms including a wireless handset, a pager, a personal digital assistant (PDA), a gaming device, or a media player. The UE 300 includes a touch screen display 301 having a touch-sensitive surface for input by a user. A small number of application icons 303 are illustrated within the touch screen display 301. It is understood that in different embodiments, any number of application icons 303 may be presented in the touch screen display 301. In some embodiments of the UE 300, a user may be able to download and install additional applications on the UE 300, and an icon associated with such downloaded and installed applications may be added to the touch screen display 301 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 301 to show a web page. The web page may be obtained via wireless communications with a base transceiver station, a wireless network access node, a peer UE 300 or any other wireless communication network or system.

Figure 7:
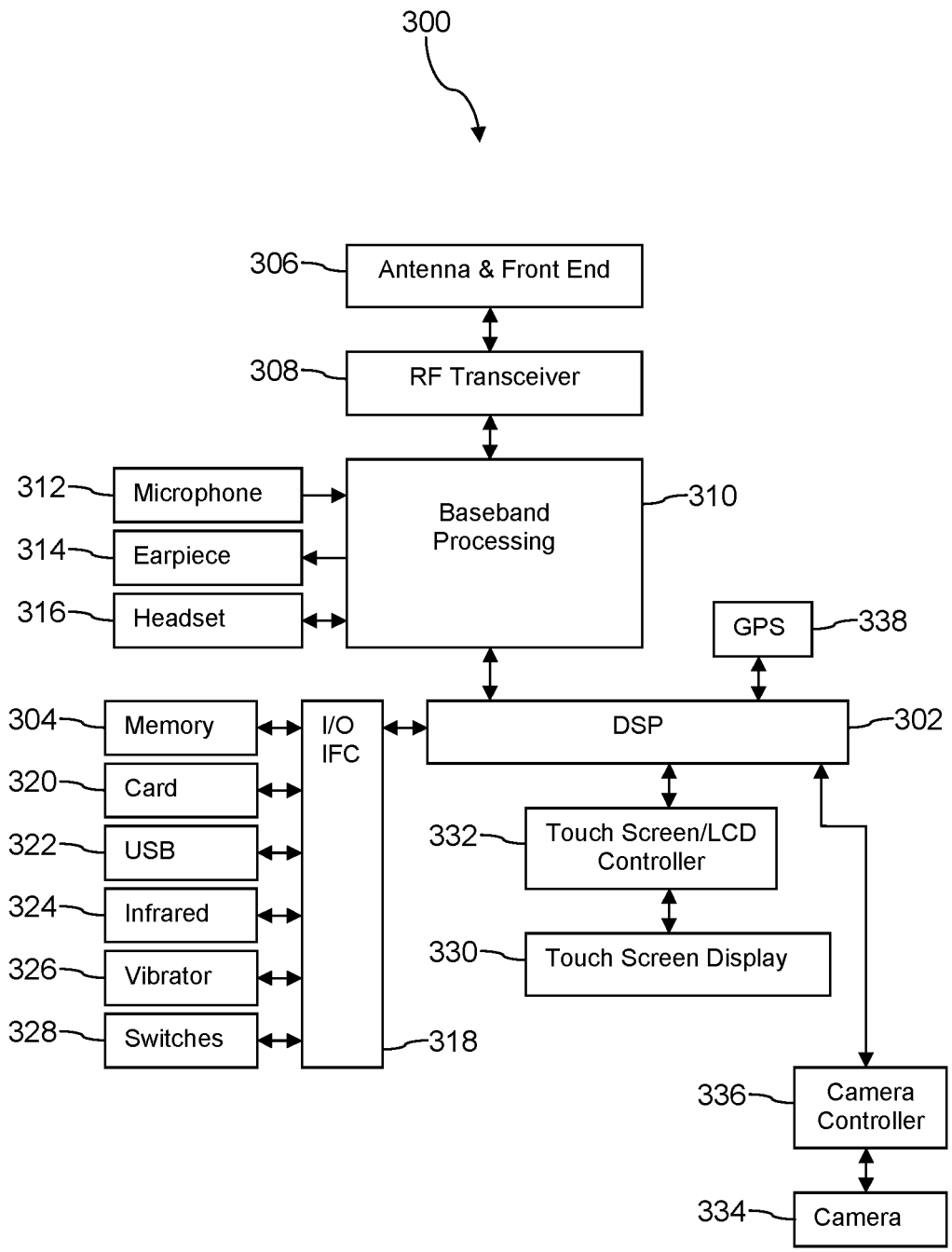
FIG. 7 is a block diagram of a hardware architecture of a mobile communication device according to an embodiment of the disclosure.

FIG. 7 shows a block diagram of the UE 300. While a variety of known components of handsets are depicted, in an embodiment a subset of the listed components and/or additional components not listed may be included in the UE 300. The UE 300 includes a digital signal processor (DSP) 302 and a memory 304. As shown, the UE 300 may further include an antenna and front end unit 306, a radio frequency (RF) transceiver 308, a baseband processing unit 310, a microphone 312, an earpiece speaker 314, a headset port 316, an input/output interface 318, a removable memory card 320, a universal serial bus (USB) port 322, an infrared port 324, a vibrator 326, one or more electro-mechanical switches 328, a touch screen liquid crystal display (LCD) with a touch screen display 330, a touch screen/LCD controller 332, a camera 334, a camera controller 336, and a global positioning system (GPS) receiver 338. In an embodiment, the UE 300 may include another kind of display that does not provide a touch sensitive screen. In an embodiment, the UE 300 may include both the touch screen display 330 and additional display component that does not provide a touch sensitive screen. In an embodiment, the DSP 302 may communicate directly with the memory 304 without passing through the input/output interface 318. Additionally, in an embodiment, the UE 300 may comprise other peripheral devices that provide other functionality.

The DSP 302 or some other form of controller or central processing unit operates to control the various components of the UE 300 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the UE 300 to function as a peripheral device to exchange information with a personal computer or other computer system. The infrared port 324 and other optional ports such as a Bluetooth® interface or an IEEE 802.11 compliant wireless interface may enable the UE 300 to communicate wirelessly with other nearby handsets and/or wireless base stations. In an embodiment, the UE 300 may comprise a near field communication (NFC) transceiver. The NFC transceiver may be used to complete payment transactions with point-of-sale terminals or other communications exchanges. In an embodiment, the UE 300 may comprise a radio frequency identify (RFID) reader and/or writer device.

The switches 328 may couple to the DSP 302 via the input/output interface 318 to provide one mechanism for the user to provide input to the UE 300. Alternatively, one or more of the switches 328 may be coupled to a motherboard of the UE 300 and/or to components of the UE 300 via a different path (e.g., not via the input/output interface 318), for example coupled to a power control circuit (power button) of the UE 300. The touch screen display 330 is another input mechanism, which further displays text and/or graphics to the user. The touch screen LCD controller 332 couples the DSP 302 to the touch screen display 330. The GPS receiver 338 is coupled to the DSP 302 to decode global positioning system signals, thereby enabling the UE 300 to determine its position.

Figure 8A:
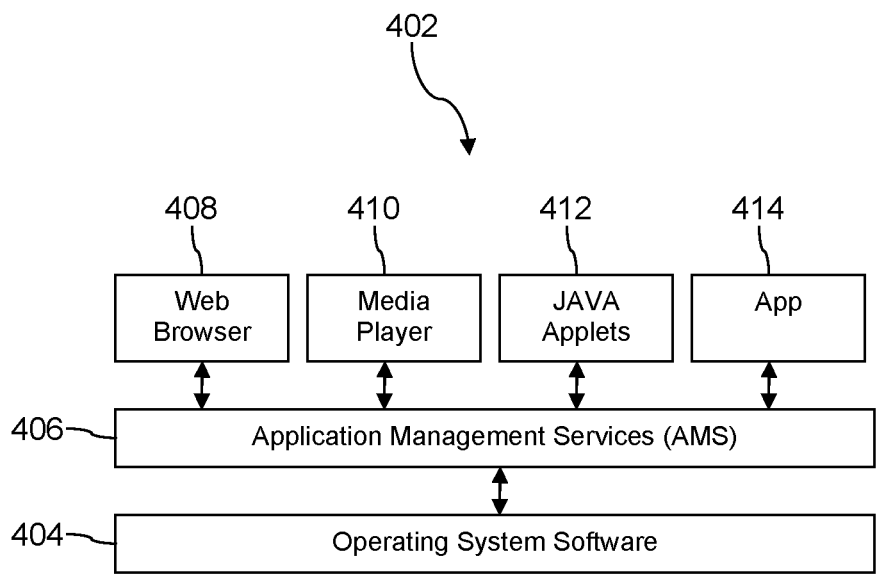
FIG. 8A is a block diagram of a software architecture of a mobile communication device according to an embodiment of the disclosure.

FIG. 8A illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services (AMS) 406 that transfer control between applications running on the UE 300. Also shown in FIG. 8A are a web browser application 408, a media player application 410, JAVA applets 412, and an application 414. The web browser application 408 may be executed by the UE 300 to browse content and/or the Internet, for example when the UE 300 is coupled to a network via a wireless link.

The web browser application 408 may permit a user to enter information into forms and select links to retrieve and view web pages. The media player application 410 may be executed by the UE 300 to play audio or audiovisual media. The JAVA applets 412 may be executed by the UE 300 to provide a variety of functionality including games, utilities, and other functionality. The application 414 may be employed to implement an LPA, such as LPA 118 and/or 138. As such, the application 414 may be employed to manage eSIM credentials as described in detail above.

Figure 8B:
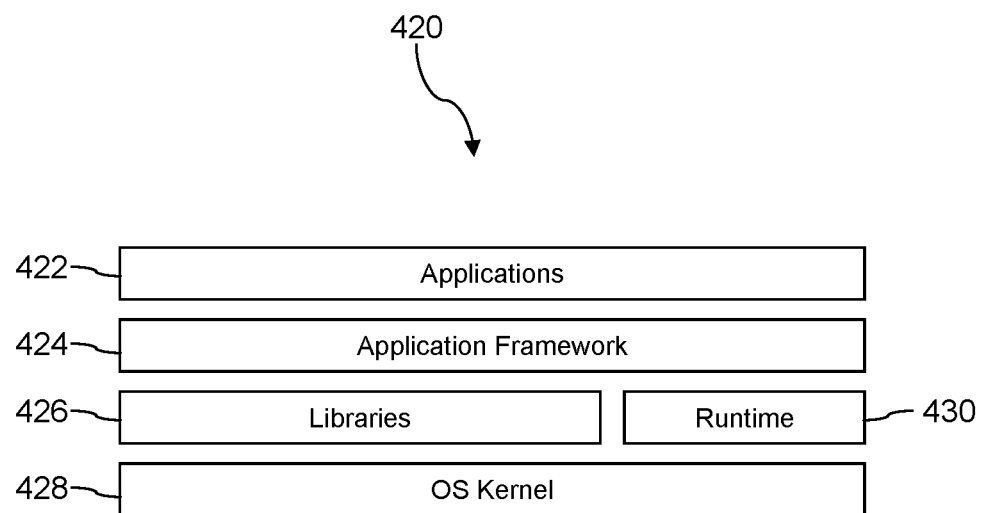
FIG. 8B is a block diagram of another software architecture of a mobile communication device according to an embodiment of the disclosure.

FIG. 8B illustrates an alternative software environment 420 that may be implemented by the DSP 302. The DSP 302 executes operating system kernel (OS kernel) 428 and an execution runtime 430. The DSP 302 executes applications 422 that may execute in the execution runtime 430 and may rely upon services provided by the application framework 424. Applications 422 and the application framework 424 may rely upon functionality provided via the libraries 426.

Figure 9:
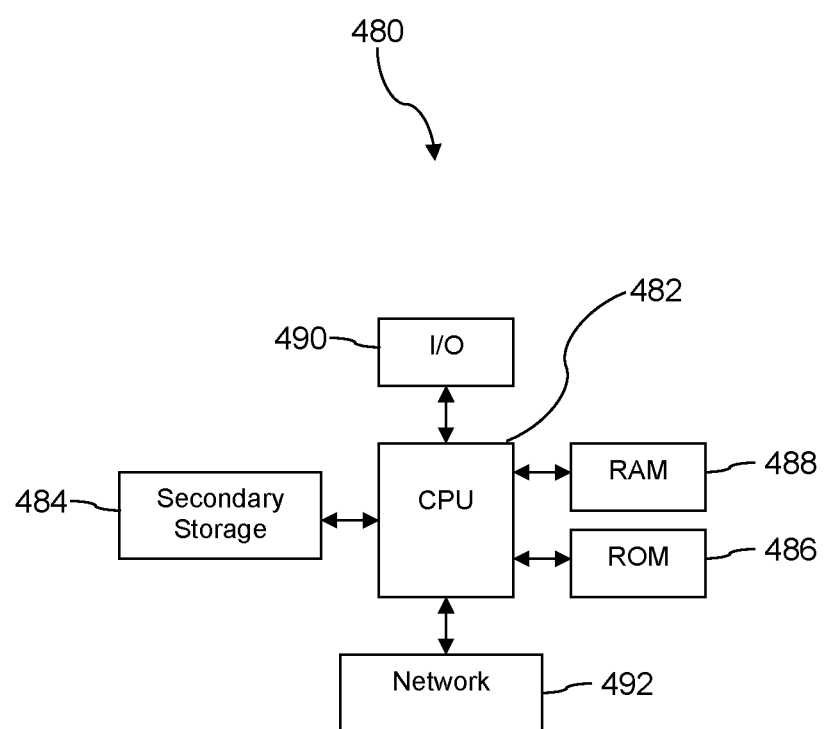
FIG. 9 is a block diagram of a computer system according to an embodiment of the disclosure.

FIG. 9 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 480 is turned on or booted, the CPU 482 may execute a computer program or application. For example, the CPU 482 may execute software or firmware stored in the ROM 486 or stored in the RAM 488. In some cases, on boot and/or when the application is initiated, the CPU 482 may copy the application or portions of the application from the secondary storage 484 to the RAM 488 or to memory space within the CPU 482 itself, and the CPU 482 may then execute instructions that the application is comprised of. In some cases, the CPU 482 may copy the application or portions of the application from memory accessed via the network connectivity devices 492 or via the I/O devices 490 to the RAM 488 or to memory space within the CPU 482, and the CPU 482 may then execute instructions that the application is comprised of. During execution, an application may load instructions into the CPU 482, for example load some of the instructions of the application into a cache of the CPU 482. In some contexts, an application that is executed may be said to configure the CPU 482 to do something, e.g., to configure the CPU 482 to perform the function or functions promoted by the subject application. When the CPU 482 is configured in this way by the application, the CPU 482 becomes a specific purpose computer or a specific purpose machine.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), flash drive, ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of sharing electronic subscriber identity module (eSIM) credentials between two mobile communication devices, comprising:
    establishing, by a source user equipment (UE) comprising a first of the mobile communication devices, a data connection with a subscription manager data preparation (SMDP+) server associated with eSIM credentials stored at the source UE;
    notifying, by the source UE, the SMDP+ server of an intent to transfer the eSIM credentials;
    receiving, by the source UE, metadata describing an activation code containing identification data for the eSIM credentials; and
    forwarding, by the source UE, the activation code to a destination UE comprising a second of the mobile communication devices, the activation code forwarded to support a download of the eSIM credentials to the destination UE from the SMDP+ server.

2. The method of claim 1, further comprising:
    receiving, by a local profile assistant (LPA) at the source UE, user input via a user interface (UI), the user input requesting a transfer of the eSIM credentials, prior to establishing the data connection with the SMDP+ server.

3. The method of claim 1, further comprising:
    deleting, by the source UE, the eSIM credentials stored at the source UE after notifying the SMDP+ server of the intent to transfer the eSIM credentials.

4. The method of claim 1, further comprising:
    disabling, by the source UE, the eSIM credentials stored at the source UE by placing the eSIM credentials in an inactive state after notifying the SMDP+ server of the intent to transfer the eSIM credentials.

5. The method of claim 1, further comprising:
    notifying, by the source UE, the SMDP+ server that the eSIM credentials have been deactivated prior to receiving the metadata describing the activation code containing the identification data for the eSIM credentials.

6. The method of claim 1, wherein the activation code is a quick response (QR) code, and wherein forwarding the activation code to the destination UE includes displaying the QR code on a display at the source UE.

7. The method of claim 1, wherein forwarding the activation code to the destination UE includes transmitting the activation code to the destination UE via a wireless interface.

8. The method of claim 1, wherein the activation code includes a fully qualified domain name (FQDN) address of the SMDP+ server, a matching identifier (ID) associated with the eSIM credentials, an indication that a confirmation code validation is required, or combinations thereof.

9. A method of sharing electronic subscriber identity module (eSIM) credentials between two mobile communication devices, comprising:
    receiving, by a destination user equipment (UE) comprising a second of the mobile communication devices, an activation code from a source UE comprising a first of the mobile communication devices, the activation code generated by the source UE based on metadata from a subscription manager data preparation (SMDP+) server, wherein the activation code contains identification data for eSIM credentials associated with the source UE;
    obtaining, by the destination UE, the identification data for eSIM credentials from the activation code;
    establishing, by the destination UE, a data connection with the SMDP+ server associated with the eSIM credentials based on the identification data for eSIM credentials;
    transmitting, by the destination UE, the identification data for eSIM credentials to the SMDP+ server; and
    receiving, by the destination UE, the eSIM credentials from the SMDP+ server.

10. The method of claim 9, wherein the activation code is a quick response (QR) code, and wherein receiving the activation code includes scanning the QR code from a display at the source UE.

11. The method of claim 9, wherein the activation code is received via a wireless interface at the destination UE.

12. The method of claim 9, further comprising:
receiving, by the destination UE, an input user defined code from a user; and
forwarding, by the destination UE, the input user defined code to the SMDP+ server for validation.

13. The method of claim 9, wherein the activation code includes a fully qualified domain name (FQDN) address of the SMDP+ server, and wherein the FQDN address of the SMDP+ server is employed to establish the data connection with the SMDP+ server.

14. The method of claim 9, wherein the identification data for eSIM credentials transmitted to the SMDP+ server includes a matching identifier (ID) associated with the eSIM credentials.

15. A method of sharing electronic subscriber identity module (eSIM) credentials between two mobile communication devices, comprising:
establishing, by a subscription manager data preparation (SMDP+) server, a data connection with a source user equipment (UE) comprising a first of the mobile communication devices and containing eSIM credentials;
receiving, by the SMDP+ server, a notification of an intent to transfer the eSIM credentials;
transmitting, by the SMDP+ server, metadata describing an activation code to the source UE, the activation code containing identification data for the eSIM credentials;
establishing, by the SMDP+ server, a data connection with a destination UE comprising a second of the mobile communication devices;
receiving, by the SMDP+ server, the identification data for the eSIM credentials from the destination UE; and
initiating, by the SMDP+ server, a download of eSIM credentials from the SMDP+ server to the destination UE.

16. The method of claim 15, wherein the notification of the intent to transfer the eSIM credentials indicates the eSIM credentials are queued for deletion on the source UE.

17. The method of claim 15, wherein the notification of the intent to transfer the eSIM credentials indicates the eSIM credentials are queued for disabling on the source UE by placing the eSIM credentials in an inactive state.

18. The method of claim 15, further comprising:
receiving, by the SMDP+ server, a notification from the source UE that the eSIM credentials have been deactivated prior to transmitting the metadata describing the activation code containing the identification data for the eSIM credentials.

19. The method of claim 15, wherein the activation code includes a fully qualified domain name (FQDN) address of the SMDP+ server, a matching identifier (ID) associated with the eSIM credentials, a user defined code associated with a user, or combinations thereof.

20. The method of claim 15, wherein the activation code is a quick response (QR) code, and wherein the metadata describing the activation code supports generating the QR code for display at the source UE and scanning at the destination UE.

* * * * *